(12) United States Patent
Taoka et al.

(10) Patent No.: US 8,472,548 B2
(45) Date of Patent: Jun. 25, 2013

(54) RADIO BASE STATION APPARATUS AND METHOD FOR SELECTING MODULATION AND CODING SCHEME

(75) Inventors: Hidekazu Taoka, Tokyo (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 32 days.

(21) Appl. No.: 13/203,028

(22) PCT Filed: Jan. 29, 2010

(86) PCT No.: PCT/JP2010/051197
§ 371 (c)(1),
(2), (4) Date: Dec. 14, 2011

(87) PCT Pub. No.: WO2010/098168
PCT Pub. Date: Sep. 2, 2010

(65) Prior Publication Data
US 2012/0076227 A1    Mar. 29, 2012

(30) Foreign Application Priority Data
Feb. 27, 2009    (JP) ................................. 2009-045316

(51) Int. Cl.
*H04L 1/02* (2006.01)
*H04B 7/02* (2006.01)
(52) U.S. Cl.
USPC ........... 375/267; 375/316; 375/347; 370/334; 455/101

(58) Field of Classification Search
USPC ............ 375/267, 316, 347; 370/334; 455/101
See application file for complete search history.

(56) References Cited

U.S. PATENT DOCUMENTS
2008/0063116 A1* 3/2008 Yokoyama .................... 375/299
2009/0323541 A1* 12/2009 Sagfors et al. ................ 370/252

OTHER PUBLICATIONS

N. Maeda, et al., "Experiments on Real-Time 1 Gbps Packet Transmission Using Antenna-Independent AMC in MIMO-OFDM Broadband Packet Radio Access," in Proc. IEEE VTC2005-Fall, vol. 3, pp. 1628-1632, Sep. 2005, 5 pages.
International Search Report issued in PCT/JP2010/051197, mailed on Apr. 20, 2010, 1 page.

\* cited by examiner

*Primary Examiner* — Ted Wang
(74) *Attorney, Agent, or Firm* — Osha Liang LLP

(57) ABSTRACT

Provided is a radio base station apparatus capable of selecting an optimal modulation and coding scheme for each transmission stream easily. The radio base station apparatus has a CQI information decoder (101) configured to decode CQIs of plural downlink transmission streams and an MCS selector (102) that has an N-dimensional table (two-dimensional reference table (1021)) in accordance with the number N of downlink transmission streams where combinations of modulation and coding scheme between the plural downlink transmission streams are defined in accordance with each of the CQIs of the downlink transmission streams and is configured to select from the combinations of modulation and coding scheme for the downlink transmission streams based on each of the CQIs of the downlink transmission streams decoded by the CQI information decoder (101).

9 Claims, 7 Drawing Sheets

1021

|  | (1, 6)<br>#1:MCS#1<br>#2:MCS#6 | (2, 6)<br>#1:MCS#2<br>#2:MCS#6 | (3, 6)<br>#1:MCS#3<br>#2:MCS#6 | (4, 6)<br>#1:MCS#4<br>#2:MCS#6 | (5, 6)<br>#1:MCS#5<br>#2:MCS#6 | ·Z (6, 6)<br>#1:MCS#6<br>#2:MCS#6 |
|---|---|---|---|---|---|---|
|  | (1, 5)<br>#1:MCS#1<br>#2:MCS#5 | (2, 5)<br>#1:MCS#2<br>#2:MCS#5 | (3, 5)<br>#1:MCS#3<br>#2:MCS#5 | (4, 5)<br>#1:MCS#4<br>#2:MCS#5 | (5, 5)<br>#1:MCS#5<br>#2:MCS#5 | (6, 5)<br>#1:MCS#6<br>#2:MCS#5 |
| STREAM #2 CQI | (1, 4)<br>#1:MCS#1<br>#2:MCS#4 | (2, 4)<br>#1:MCS#2<br>#2:MCS#4 | (3, 4)<br>#1:MCS#3<br>#2:MCS#4 | (4, 4)<br>#1:MCS#4<br>#2:MCS#4 | (5, 4)<br>#1:MCS#5<br>#2:MCS#4 | (6, 4)<br>#1:MCS#6<br>#2:MCS#4 |
|  | (1, 3)<br>#1:MCS#1<br>#2:MCS#3 | (2, 3)<br>#1:MCS#2<br>#2:MCS#3 | (3, 3)<br>#1:MCS#3<br>#2:MCS#3 | (4, 3)<br>#1:MCS#4<br>#2:MCS#3 | (5, 3)<br>#1:MCS#5<br>#2:MCS#3 | (6, 3)<br>#1:MCS#6<br>#2:MCS#3 |
|  | (1, 2)<br>#1:MCS#1<br>#2:MCS#2 | (2, 2)<br>#1:MCS#2<br>#2:MCS#2 | (3, 2)<br>#1:MCS#3<br>#2:MCS#2 | (4, 2)<br>#1:MCS#4<br>#2:MCS#2 | (5, 2)<br>#1:MCS#5<br>#2:MCS#2 | (6, 2)<br>#1:MCS#6<br>#2:MCS#2 |
|  | ·X (1, 1)<br>#1:MCS#1<br>#2:MCS#1 | (2, 1)<br>#1:MCS#2<br>#2:MCS#1 | (3, 1)<br>#1:MCS#3<br>#2:MCS#1 | (4, 1)<br>#1:MCS#4<br>#2:MCS#1 | (5, 1)<br>#1:MCS#5<br>#2:MCS#1 | ·Y (6, 1)<br>#1:MCS#6<br>#2:MCS#1 |

STREAM #1 CQI

| | | | | | |
|---|---|---|---|---|---|
| (1, 6) #1:MCS#1 #2:MCS#6 | (2, 6) #1:MCS#2 #2:MCS#6 | (3, 6) #1:MCS#3 #2:MCS#6 | (4, 6) #1:MCS#4 #2:MCS#6 | (5, 6) #1:MCS#5 #2:MCS#6 | (6, 6) #1:MCS#6 #2:MCS#6 |
| (1, 5) #1:MCS#1 #2:MCS#5 | (2, 5) #1:MCS#2 #2:MCS#5 | (3, 5) #1:MCS#3 #2:MCS#5 | (4, 5) #1:MCS#4 #2:MCS#5 | (5, 5) #1:MCS#5 #2:MCS#5 | (6, 5) #1:MCS#6 #2:MCS#5 |
| (1, 4) #1:MCS#1 #2:MCS#4 | (2, 4) #1:MCS#2 #2:MCS#4 | (3, 4) #1:MCS#3 #2:MCS#4 | (4, 4) #1:MCS#4 #2:MCS#4 | (5, 4) #1:MCS#5 #2:MCS#4 | (6, 4) #1:MCS#6 #2:MCS#4 |
| (1, 3) #1:MCS#1 #2:MCS#3 | (2, 3) #1:MCS#2 #2:MCS#3 | (3, 3) #1:MCS#3 #2:MCS#3 | (4, 3) #1:MCS#4 #2:MCS#3 | (5, 3) #1:MCS#5 #2:MCS#3 | (6, 3) #1:MCS#6 #2:MCS#3 |
| (1, 2) #1:MCS#1 #2:MCS#2 | (2, 2) #1:MCS#2 #2:MCS#2 | (3, 2) #1:MCS#3 #2:MCS#2 | (4, 2) #1:MCS#4 #2:MCS#2 | (5, 2) #1:MCS#5 #2:MCS#2 | (6, 2) #1:MCS#6 #2:MCS#2 |
| (1, 1) #1:MCS#1 #2:MCS#1 | (2, 1) #1:MCS#2 #2:MCS#1 | (3, 1) #1:MCS#3 #2:MCS#1 | (4, 1) #1:MCS#4 #2:MCS#1 | (5, 1) #1:MCS#5 #2:MCS#1 | (6, 1) #1:MCS#6 #2:MCS#1 |

STREAM #2 CQI (vertical axis)
STREAM #1 CQI (horizontal axis)

FIG.4

RADIO BASE STATION APPARATUS AND METHOD FOR SELECTING MODULATION AND CODING SCHEME

TECHNICAL FIELD

The present invention relates to a radio base station apparatus and a method for selecting a modulation and coding scheme, and particularly to a radio base station apparatus and a method for selecting a modulation and coding scheme using Multiple Input Multiple Output (MIMO) system and Adaptive Modulation and Coding (AMC) system.

BACKGROUND ART

Recently, in order to achieve higher speed and higher capacity of radio communications, attention has been given to a communication technique using the MIMO (Multiple Input Multiple Output) system. In this MIMO system, plural transmission stream signals are propagated in space in different manner thereby to achieve improvement of transmission rate and signal quality. At the reception side, there is need to separate such plural transmission streams appropriately and obtain a reception signal. As a signal separating method for realizing preferable characteristics from the plural transmission streams, there is known a Maximum Likelihood Detection (MLD) signal separating method.

In this MLD signal separating method, out of all available symbol groups each of which is made of plural symbols in plural transmission streams transmitted simultaneously, a maximum likelihood symbol group is specified thereby to estimate plural transmitted symbols. Specifically, a symbol group of minimum distance between an actual reception signal and a symbol group affected by channel fluctuations (evaluated with a square of Euclidean distance in symbol constellation) is finally detected by the MLD signal separating method.

Besides, in this MIMO system, the AMC (Adaptive Modulation and Coding) system is performed in order to improve the throughput of the overall system by performing transmission at appropriate transmission rates in accordance with the channel state that varies with time. In this AMC system, a Modulation and Coding Scheme (MCS) is selected with which a suitable transmission rate can be achieved in accordance with the channel state.

In this MIMO system, there are plural transmission streams and they are transmitted in different channel states (channel paths). In order to simplify the processing of selecting an MCS for each transmission stream, there has been proposed a technique of preparing a table in which each of various MCSs is associated with a CQI (Channel Quality Indicator) (received SINR) and an error rate when it is assumed that the modulation scheme is equally used for all transmission streams and selecting an MCS in accordance with a CQI measured of each transmission stream (for example, see NPL 1).

CITATION LIST

Non Patent Literature

NPL 1: N. Maeda, T. Kataoka, J. Kawamoto, K. Higuchi, and M. Sawahashi, "Experiments on real-time 1 Gbps packet transmission using antenna-independent AMC in MIMO-OFDM broadband packet radio access," in Proc. IEEE VTC2005-Fall, vol. 3, pp. 1628-1632, September 2005.

SUMMARY OF THE INVENTION

Technical Problem

According to the technique disclosed in the NPL 1, the processing of selecting an MCS can be simplified. However, when there is a great difference in reception level between transmission streams, an optimal MCS for each transmission stream cannot be selected for each transmission stream, which causes reduction in throughput of the overall system. Therefore, there is a demand for selecting an optimal MCS for each transmission stream easily without causing any troubles.

The present invention was carried out in view of the foregoing, and has an object to provide a radio base station apparatus and a method for selecting a modulation and coding scheme capable of selecting an optimal MCS for each transmission stream easily.

Solution to Problem

A radio base station apparatus according to an aspect of the present invention is characterized by comprising: decoding section configured to decode CQIs of plural downlink transmission streams; and selecting section configured to have an N-dimensional table in accordance with a number N of the downlink transmission streams where combinations of modulation and coding scheme between the plural downlink transmission streams are defined in accordance with the CQIs of the respective downlink transmission streams, the selecting section configured to select a combination of modulation and coding scheme between the plural downlink transmission streams based on each of the CQIs of the downlink transmission streams decoded by the decoding section.

A radio base station apparatus according to another aspect of the present invention is characterized by comprising: decoding section configured to decode CQIs of plural downlink transmission streams; and selecting section configured to have a table in which modulation and coding schemes are defined in accordance with the CQIs of the respective downlink transmission streams, the selecting section configured to select from the modulation and coding schemes of the downlink transmission streams based on the CQIs of the downlink transmission streams decoded by the decoding section, in ascending order of CQI.

Technical Advantage of the Invention

According to the present invention, the table in which combinations of modulation and coding scheme between plural downlink transmission streams are defined in accordance with CQIs of the respective downlink transmission streams is used to be able to select a combination of modulation and coding scheme of the plural downlink transmission streams in accordance with the CQIs of the downlink transmission streams. This makes it possible to select optimal modulation and coding schemes for respective downlink transmission streams collectively, thereby facilitating selection of an optimal modulation and coding scheme for each transmission stream.

Besides, according to the present invention, the table in which modulation and coding schemes are defined in accordance with CQIs of respective downlink transmission streams is used as a basis to select from the modulation and coding schemes in accordance with the CQIs of the downlink transmission streams in ascending CQI order. This makes it possible to perform selecting of modulation and coding schemes without consideration of dependence on a modulation and coding scheme of a downlink transmission stream of a greater CQI and to perform selecting of modulation and coding schemes with reference to a preselected modulation and coding scheme of the downlink transmission stream, thereby facilitating selecting of an optimal modulation and coding scheme for each transmission stream.

BRIEF DESCRIPTION OF DRAWINGS

FIG. 3 is a pattern diagram illustrating an example of a two-dimensional reference table provided in an MCS selector of the radio base station apparatus according to the embodiment 1;

FIG. 4 is a pattern diagram illustrating an example of a two-dimensional reference table provided in an MCS selector of a radio base station apparatus according to an embodiment 2 of the present invention;

DESCRIPTION OF EMBODIMENTS

With reference to the attached drawings, embodiments of the present invention will be described in detail below. As explained above, the MLD signal separating method in the MIMO system is such that out of all available symbol groups each of which is made of plural symbols in plural transmission streams transmitted simultaneously, a symbol group of minimum distance between an actual reception signal and the symbol group affected by channel fluctuations (that is evaluated by a square of Euclidean distance in symbol constellation) is specified thereby to estimate transmitted plural symbols. In order to estimate the transmitted plural symbols appropriately, it is necessary to identify their symbol group specifically.

In this case, the grouped symbols in the symbol group increase or decrease in accordance with the Modulation and Coding Scheme (MCS) selected at the transmission side. When the number of symbols increases or decreases, it is sometimes difficult to estimate transmitted plural symbols appropriately. For example, the distance between the actual reception signal and the symbol group affected by the channel fluctuations sometimes cannot be measured. That is, considering the throughput of the overall system, an optimal MCS for a certain transmission stream cannot be obtained only based on a CQI of the transmission stream independently, but depending on MCSs (particularly the modulation schemes) of other transmission streams. Accordingly, at the transmission side, when MCSs are selected for plural transmission streams, it is preferable to consider dependence between them.

The inventors of the present invention have noted this point and made the present invention to select an optimal MCS for each transmission stream easily. That is, the present invention is such that CQIs of plural downlink transmission streams are measured, an N-dimensional table in accordance with the number N of the transmission streams defining MCS combinations between the plural downlink transmission streams in accordance with the CQIs of the respective downlink transmission streams is used to select an MCS combination between the plural downlink transmission streams in accordance with the measured CQIs of the downlink transmission streams, thereby selecting an optimal MCS of each transmission stream.

Embodiment 1

Figure 1:
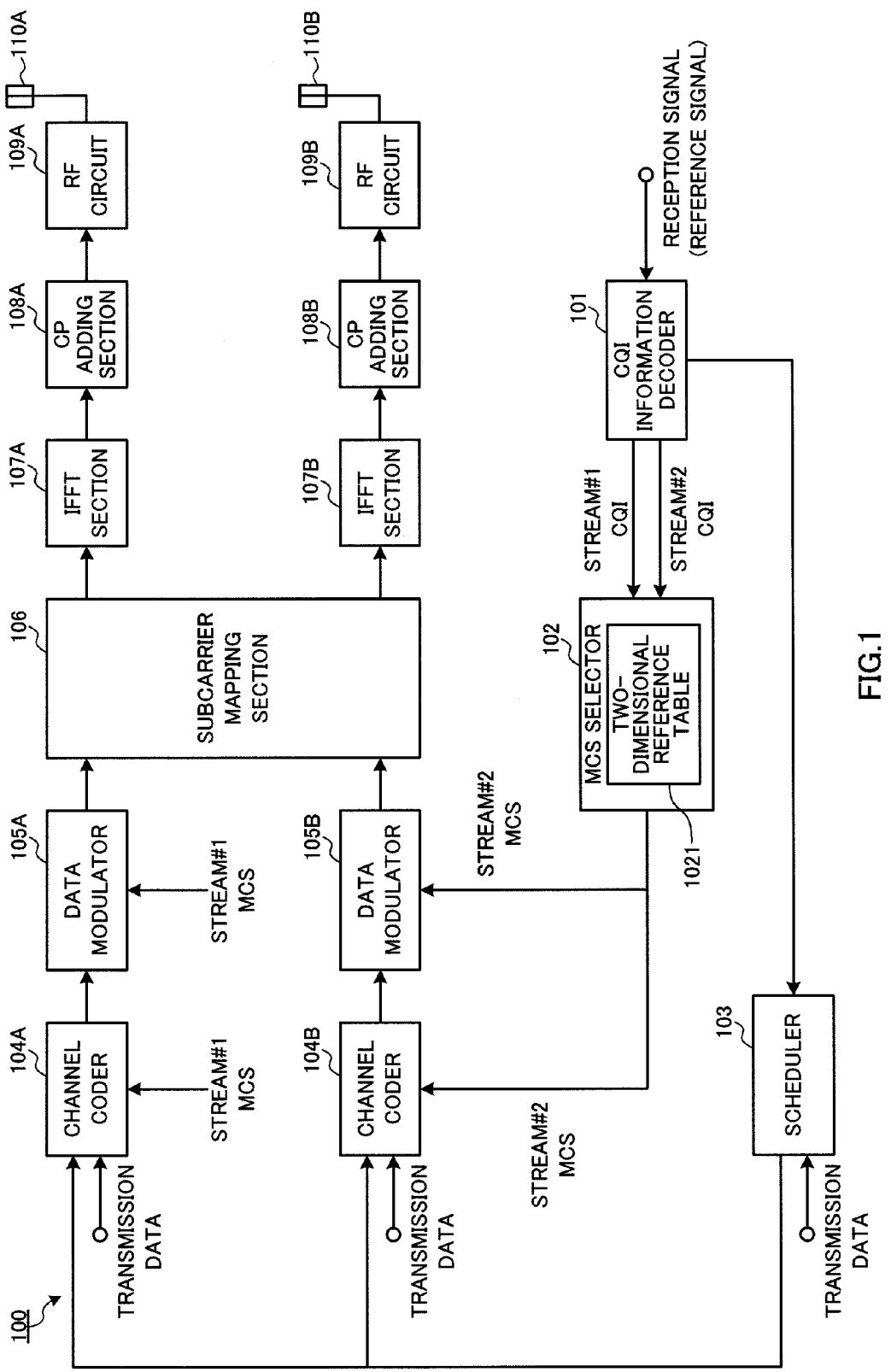
FIG. 1 is a block diagram illustrating a configuration of a transmitting unit of a radio base station apparatus according to an embodiment 1 of the present invention.
Figure 2:
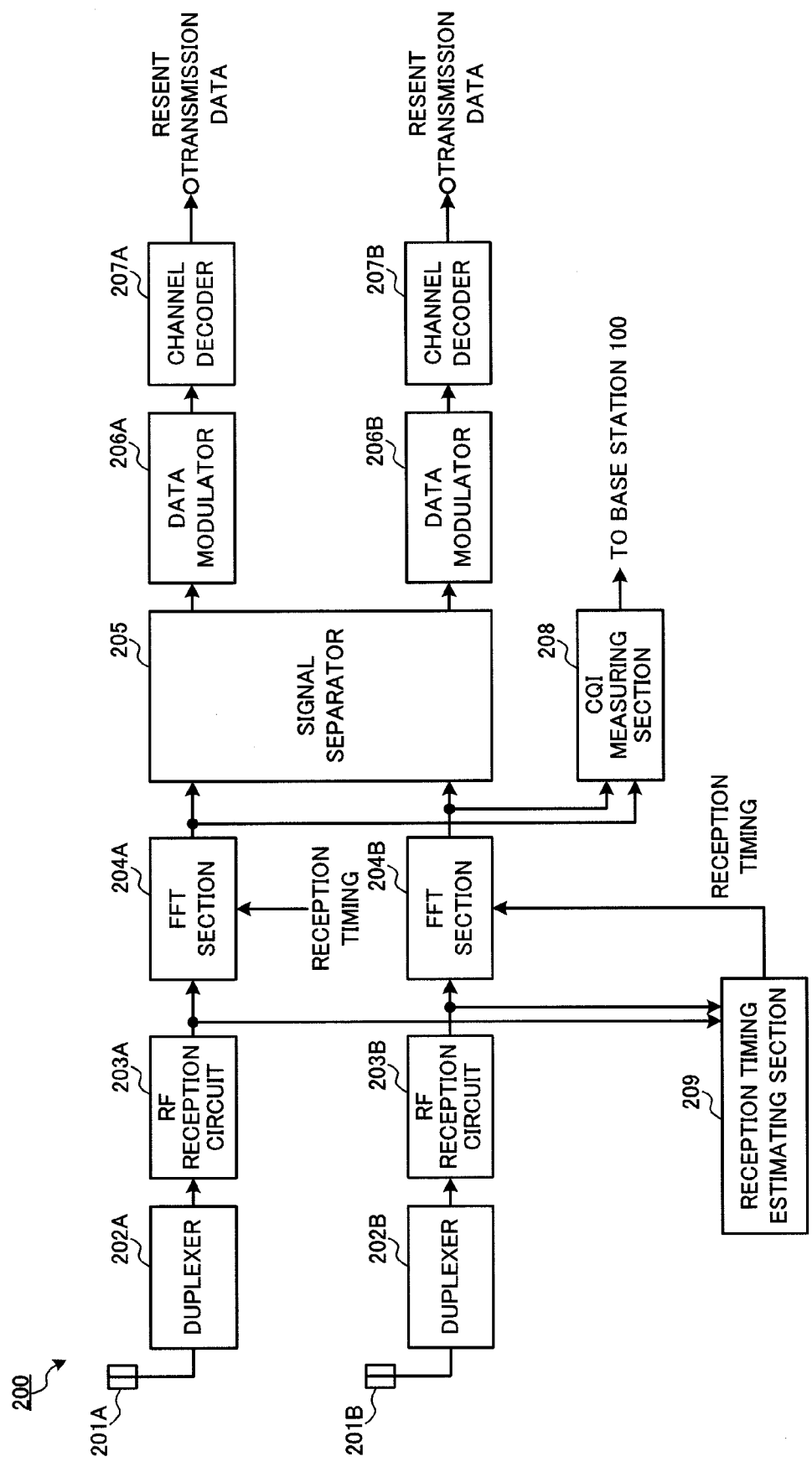
FIG. 2 is a block diagram illustrating a configuration of a receiving unit of a mobile station apparatus according to the embodiment 1.

FIG. 1 is a block diagram illustrating a configuration of a transmitting unit of a ratio base station apparatus 100 (hereinafter referred to as a "base station") according to an embodiment 1 of the present invention. FIG. 2 is a block diagram illustrating a configuration of a receiving unit of a mobile station apparatus 200 (hereinafter referred to as a "mobile station") according to the embodiment 1 of the present invention. Here, the configurations of the base station 100 and the mobile station 200 illustrated in FIGS. 1 and 2 are simplified for easy explanation of the present invention, but it is assumed that they have respective typical configurations. In addition, in the description, the base station 100 and the mobile station 200 illustrated in FIGS. 1 and 2 have two transmission/reception antennas, which is not intended for limiting the present invention. They may have three or more transmission/reception antennas.

In the base station 100 illustrated in FIG. 1, a reference signal contained in a reception signal is input to a CQI information decoder 101 that serves as decoding section. The CQI information decoder 101 decodes a CQI of a downlink transmission stream (hereinafter referred to simply as "stream") measured of the reference signal for measuring quality of a wide band in the mobile station 200. In this case, the CQI information decoder 101 decodes CQIs (stream #1 CQI and stream #2 CQI) of the downlink transmission streams #1 and #2 fed back from the mobile station 200 and outputs them to an MCS selector 102 and a scheduler 103.

The MCS selector 102 functions as selecting section and has a two-dimensional reference table 1021 in which optimal MCS combinations between the streams #1 and #2 are defined in advance in accordance with the stream #1 CQI and the stream #2 CQI. The MCS selector 102 selects an optimal MCS for each stream in accordance with the stream #1 CQI and the stream #2 CQI input from the CQI information decoder 101. Then, it outputs the selected MCS to a channel coder 104 and a data modulator 105 of each stream, which are described later. Besides, the MCS selected by the MCS selector 102 is communicated to a downlink control signal generator, and then, combined in a downlink control signal generated by this downlink control signal generator to be communicated to the mobile station 200 on the downlink.

Here, in the base station 100 illustrated in FIG. 1, the MCS selector 102 has the two-dimensional reference table 1021 in order to perform radio communications with two streams via the two antennas. If there are three or more streams, the dimension of the reference table is changed accordingly. For example, if there are N streams (N is a positive integer), the MCS selector 102 has an N-dimensional reference table. That is, the MCS selector 102 has an N-dimensional table in accordance with the number N of streams in which table MCS combinations between plural downlink transmission streams are defined in accordance with CQIs of respective transmission streams.

FIG. 3 is a pattern diagram illustrating an example of the two-dimensional reference table 1021 of the MCS selector 102 of the base station 100 according to the embodiment 1. Here, for convenience of explanation, the data modulation scheme (modulation scheme) includes QPSK (Quadrature Phase Shift Keying) and 16QAM (Quadrature Amplitude Modulation) and the channel coding rate (coding rate) includes ⅓, ½ and ¾, which form MCS combinations of the MCS #1 to MCS #6 in accordance with the stream #1 CQI and the stream #2 CQI. However, the modulation scheme and the coding rate are not restricted to them. In the two-dimensional reference table 1021 illustrated in FIG. 3, the MCS #1 to MCS #3 have QPSK as modulation scheme and ⅓, ½ and ¾ as coding rate, respectively. The MCS #4 to MCS #6 have 16QAM as modulation scheme and ⅓, ½ and ¾ as coding rate, respectively.

In the two-dimensional reference table 1021, as illustrated in FIG. 3, there are shown plural areas for specifying MCSs to select for the streams #1 and #2 in accordance with the CQIs of the streams #1 and #2 (the stream #1 CQI and the stream #2 CQI) from the mobile station 200. Particularly, in the two-dimensional reference table 1021, the plural areas (hereinafter referred to as "table area" appropriately) are shown in which MCS combinations between the streams #1 and #2 are defined to include different modulation schemes. Each of these table areas is divided into plural areas (hereinafter referred to as "divided area" appropriately) in which MCS combinations between the streams #1 and #2 are defined to include different coding rates. Here, for convenience of explanation, these divided areas are denoted by (1, 1) to (6, 6). The above-mentioned table areas include, for example, (1, 1) to (1, 3), (2, 1) to (2, 3) and (3, 1) to (3, 3) in which areas the modulation scheme is QPSK for both streams #1 and #2, and (4, 1) to (4, 3), (5, 1) to (5, 3) and (6, 1) to (6, 3) in which areas the modulation scheme is 16QAM for the stream #1 and QPSK for the stream #2. The MCS selector 102 selects MCSs specified by a divided area which is identified by the CQI values of the streams #1 and #2 from the mobile station 200 (the stream #1 CQI and the stream #2 CQI) as MCSs for the streams #1 and #2.

For example, when the values of the stream #1 CQI and the stream #2 CQI fall within an area (1, 1) (represented by the point X in FIG. 3), the MCS selector 102 selects the MCS #1 for the stream #1 and the MCS #1 for the stream #2. In this case, as the values of the stream #1 CQI and the stream #2 CQI are relatively low and it is determined that the reception quality of the streams #1 and #2 are not good, QPSK is selected as modulation scheme and the coding rate ⅓ is selected in the streams #1 and #2.

Besides, when the values of the stream #1 CQI and the stream #2 CQI fall within an area (6, 1) (represented by the point Y in FIG. 3), the MCS selector 102 selects the MCS #6 for the stream #1 and the MCS #1 for the stream #2. In this case, the value of the stream #1 CQI is relatively high and it is determined that the reception quality of the stream #1 is good. And, the value of the stream #2 CQI is relatively low and it is determined that the reception quality of the stream #2 is not good. From this, 16QAM is selected as modulation scheme and the coding rate ¾ is selected for the stream #1, and QPSK is selected as modulation scheme and the coding rate ⅓ is selected for the stream #2.

Further, when the values of the stream #1 CQI and the stream #2 CQI fall within the area (6, 6) (represented by point Z in FIG. 3), the MCS selector 102 selects the MCS #6 for the stream #1 and the MCS #6 for the stream #2. In this case, as the values of the stream #1 CQI and the stream #2 CQI are relatively high and it is determined that the reception quality of the streams #1 and #2 is good, 16QAM is selected as the modulation scheme and ¾ is selected as coding rate for the streams #1 and #2.

Here, in the two-dimensional reference table 1021 in FIG. 3, there is a difference in CQI thresholds for selecting an MCS combination in adjacent table areas in the above-described table areas. And, also for the divided areas belonging to the table areas, there is a difference CQI thresholds for selecting an MCS combination in divided areas belonging to the adjacent table areas. For example, in the two-dimensional reference table 1021, out of the upper limit value (threshold) of the stream #1 CQI in the areas (1, 1) to (1, 3) and the upper limit value of the stream #1 CQI in the areas (1, 4) to (1, 6), the latter is set higher. This is to prevent the adverse effect caused by dependence between the stream #1 MCS and the stream #2 MCS. More specifically, this is to prevent the situation where plural transmitted symbols cannot be estimated appropriately in the separating processing of reception signals in the mobile station 200 due to different modulation schemes selected for the stream #1 CQI and the stream #2 CQI. That is, when the symbol of QPSK specified by the MCS of the stream #1 and the symbol of 16QAM specified by the MCS of the stream #2 in the areas (1, 4) to (1, 6) are combined into one symbol group, such a symbol group needs to be identified clearly to estimate plural transmitted symbols appropriately. In order to meet this need, the upper limit value of the areas (1, 4) to (1, 6) is set to be higher than the upper limit value of the stream #1 CQI in the areas (1, 1) to (1, 3). The same goes for the relations between the upper limit values of the stream #1 CQI of the areas (2, 1) to (2, 3), the areas (3, 1) to (3, 3), the areas (4, 1) to (4, 3), the areas (5, 1) to (5, 3) and the areas (6, 1) to (6, 3) and the upper limit values of the stream #1 CQI of the areas (2, 4) to (2, 6), the areas (3, 4) to (3, 6), the areas (4, 4) to (4, 6), the areas (5, 4) to (5, 6) and the areas (6, 4) to (6, 6).

Likewise, in the two-dimensional reference table 1021 in FIG. 3, out of the upper limit value of the stream #2 CQI in the areas (1, 1) to (3, 1) and the upper limit value of the stream #2 CQI in the areas (4, 1) to (6, 1), the latter is set higher. This is to prevent the situation where plural transmitted symbols cannot be estimated in the separating processing of reception signals in the mobile station 200 due to different modulation schemes selected for the stream #1 CQI and the stream #2 CQI. That is, when the symbol of 16QAM designated by the MCSs of the stream #1 in the areas (4, 1) to (6, 1) and the symbol of QPSK designated by the MCS of the stream #2 are combined into one symbol group, such a symbol group needs to be identified clearly to estimate plural symbols transmitted appropriately. In order to meet this need, the upper limit value is set to be higher than the upper limit value of the stream #2 CQI in the areas (1, 1) to (3, 1). The same goes for the relations between the upper limit values of the stream #2 CQI of the areas (1, 2) to (3, 2), the areas (1, 3) to (3, 3), the areas (1, 4) to (3, 4), the areas (1, 5) to (3, 5) and the areas (1, 6) to (3, 6) and the upper limit values of the stream #2 CQI of the areas (4, 2) to (6, 2), the areas (4, 3) to (6, 3), the areas (4, 4) to (6, 4), the areas (4, 5) to (6, 5) and the areas (4, 6) to (6, 6).

Returning to FIG. 1, description of the configuration of the base station 100 is continued. The scheduler 103 receives transmission data from a higher-level apparatus (not shown) that processes transmission signals. Besides, the scheduler 103 receives the CQI decoded in the CQI information decoder 101 and an uplink channel estimation value estimated based on the reception state of the reference signal from the mobile station 200 by a channel estimating section (not shown). The scheduler 103 performs scheduling of the transmission data with reference to these CQI and channel estimation value.

The channel coder 104A and the data modulator 105A form a part of the downlink shared channel signal (user data) generator of the stream #1 and this downlink shared channel signal generator generates a downlink shared channel signal using the transmission data from the above-described higher-level apparatus based on the schedule information determined by the scheduler 103. In this downlink shared channel signal generator, the channel coder 104A performs channel coding on the transmission data based on the coding rate designated by the MCS of the stream #1 (stream #1 MCS) from the MCS selector 102. The data modulator 105A performs modulation on the transmission data that is coded by the channel coder 104A, on the basis of the modulation scheme designated by the stream #1 MCS. The transmission data modulated by the data modulator 105A is subjected to inverse FFT at a discrete Fourier Transform section (not shown), converted from a time-line signal to a frequency-domain signal and output to a subcarrier mapping section 106.

On the other hand, the channel coder 104B and the data modulator 105B form a downlink shared channel signal (user data) generator of the stream #2 and this downlink shared channel signal generator generates a downlink shared channel signal using the transmission data from the above-described higher-level apparatus based on the schedule information determined by the scheduler 103. In this downlink shared channel signal generator, the channel coder 104B performs channel coding on the transmission data based on the coding rate designated by the MCS of the stream #2 (stream #2 MCS) from the MCS selector 102. The data modulator 105B performs modulation on the transmission data that is coded by the channel coder 104B, on the basis of the modulation scheme designated by the stream #2 MCS. The transmission data modulated by the data modulator 105B is output to the subcarrier mapping section 106.

The subcarrier mapping section 106 receives transmission data of the stream #1 processed by the channel coder 104A and the data modulator 105A and the transmission data of the stream #2 processed by the channel coder 104B and the data modulator 105B and maps them to subcarriers in accordance with the above-described schedule information.

The transmission data of the stream #1 mapped by the subcarrier mapping section 106 is subjected to Inverse Discrete Fourier Transform (IFFT) at the IFFT section 107A, in which the frequency-domain signal is converted to a time-line signal. Then, a cyclic prefix is added to the signal at a cyclic prefix adding section (CP adding section) 108A. Here, the cyclic prefix functions as a guard interval for absorbing a difference in multipath transmission delay. The transmission data to which the cyclic prefix is added is subjected to frequency conversion for converting to a radio frequency range at a radio frequency circuit (FR circuit) 109A and amplified, and then, output to the mobile station 200 on the downlink via the antenna 110A.

The transmission data of the stream #2 mapped by the subcarrier mapping section 106 is subjected to Inverse Discrete Fourier Transform (IFFT) at the IFFT section 107B, in which the frequency-domain signal is converted to a time-line signal. Then, a cyclic prefix is added to the signal at a cyclic prefix adding section (CP adding section) 108B. The transmission data to which the cyclic prefix is added is subjected to frequency conversion for converting to a radio frequency range at a radio frequency circuit (RF circuit) 109B and amplified, and then, output to the mobile station 200 on the downlink via the antenna 110B.

Next description is made about the configuration of the mobile station 200 according to the embodiment 1 with reference to FIG. 2. In the mobile station 200 illustrated in FIG. 2, the transmission signal transmitted from the base station 100 is received by an antenna 201A and separated electrically into a transmission path and a reception path by a duplexer 202A and output to an RF reception circuit 203A. Then, it is subjected to frequency conversion at the RF reception circuit 203A in which the signal is converted from the radio frequency signal to a baseband signal. Further, a cyclic prefix added to the reception signal is removed from the signal by a CP remover (not shown), which is then output to an FFT section 204A.

Likewise, the transmission signal transmitted from the base station 100 is received by an antenna 201B, separated electrically into a transmission path and a reception path by a duplexer 202B and output to an RF reception circuit 203B. Then, it is subjected to frequency conversion at the RF reception circuit 203B in which the signal is converted from the radio frequency signal to a baseband signal. Further, a cyclic prefix added to the reception signal is removed from the signal by a CP remover (not shown), which is then output to an FFT section 204B.

A reception timing estimating section 209 obtains the reception signals from the RF reception circuits 203A and 203B, estimates the reception timing (FFT processing timing) from the reference signals contained in the reception signals and communicates it to the FFT sections 204A and 204B.

The reception signal from the RF reception circuit 203A is subjected to Fourier transformation at the FFT section 204A in accordance with the reception timing communicated from the reception timing estimating section 209 and converted from the time-line signal to a frequency-domain signal. Then, the signal is output to a signal separator 205. Likewise, the reception signal from the RF reception circuit 203B is subjected to Fourier transformation at the FFT section 204B in accordance with the reception timing communicated from the reception timing estimating section 209 and converted from the time-line signal to a frequency-domain signal. Then, the signal is output to the signal separator 205.

The signal separator 205 separates the reception signals input from the FFT sections 204A and 204B by the MLD signal separating method. Then, the reception signal from the base station 100 is separated into a reception signal of the stream #1 and a reception signal of the stream #2. The reception signals of the streams #1 and #2 separated by the signal separator 205 are demapped at a subcarrier demapping section (not shown) and changed back into the time-line signals. Then, the reception signal of the stream #1 is output to a data demodulator 206A and the reception signal of the stream #2 is output to a data demodulator 206B.

The reception signal of the stream #1 is demodulated at the data demodulator 206A based on the modulation scheme contained in the MCS notified from the base station 100 and then, decoded at a channel decoder 207A based at the coding rate contained in the MCS notified from the base station 100 into the transmission data. Likewise, the reception signal of the stream #2 is demodulated at the data demodulator 206B based on the modulation scheme contained in the MCS notified from the base station 100 and then, decoded at a channel decoder 207B based on the coding rate contained in the MCS notified from the base station 100 into the transmission data. Here, the MCS from the base station 100 is obtained from a control signal demodulated by a control signal demodulator (not shown).

A CQI measuring section 208 measures the reception quality from the reception state of a reference signal contained in the reception signal output from the FFT section 204A and measures the reception quality from the reception state of a reference signal contained in the reception signal output from the FFT section 204B. The CQI information in each transmission path measured by the CQI measuring section 208 is communication to an uplink control signal generator (not shown) and transmitted to the base station 100 on the uplink while it is contained in an uplink control signal generated by the uplink control signal generator.

Thus, in the base station 100 according to the embodiment 1, the MCS selector 102 has the two-dimensional reference table 1021 in which optimal MCS combinations between the streams #1 and #2 are defined in advance in accordance with the stream #1 CQI and the stream #2 CQI, and it selects an optimal MCS combination between the streams with use of the stream #1 CQI and the stream #2 CQI input from the CQI information decoder 101. With this structure, it is possible to select optimal MCSs for the streams collectively and thereby to facilitate selecting of the optimal MCSs for the streams. Consequently, it is possible to prevent the situation where plural symbols transmitted from the mobile station 200 cannot be estimated and the transmission data needs to be sent again, thereby enhancing the throughput of the overall system.

Particularly, in the description made up to this point, radio communications are performed with two streams between the base station 100 and the mobile station 200. If radio communications are performed with three or more streams, its effect will be remarkable. Generally, when radio communications are performed with three or more streams, the number of symbols that make up one symbol group increases, and therefore, it becomes difficult to identify the symbol group clearly and estimate the transmitted symbols appropriately. However, in the base station 100 according to the present invention, as the plural-dimensional reference table 1021 in accordance with the number of streams (three or more) is provided and an optimal MCS combination between the streams is selected in accordance with the CQIs of the respective streams input from the CQI information decoder 101, it becomes possible to facilitate collective selection of optimal MCSs for respective streams.

Embodiment 2

A base station 300 according to an embodiment 2 of the present invention has an MCS selector 302 that is equivalent to the MCS selector 102. The MCS selector 302 has a two-dimensional reference table 3021 which configuration is different from that in the base station 100 according to the embodiment 1. The other structure of the base station 300 and the structure of the mobile station 200 that performs radio communications with the base station 300 are the same as those of the base station 100 and the mobile station 200 according to the embodiment 1, and therefore, their description is omitted here.

FIG. 4 is a pattern diagram illustrating an example of the two-dimensional reference table 3021 of the MCS selector 302 of the base station 300 according to the embodiment 2. In FIG. 4, like in FIG. 3, the modulation scheme includes QPSK and 16QAM and the coding rate includes ⅓, ½ and ¾. These modulation and coding schemes form MCSs #1 to #6, which are determined in accordance with the stream #1 CQI and the stream #2 CQI. However, the modulation scheme and coding rate are not restricted to them. Besides, in the two-dimensional reference table 3021 illustrated in FIG. 4, the structures of the modulation scheme and coding rate of MCSs #1 to #6 are the same as those in FIG. 3.

The two-dimensional reference table 3021 of the MCS selector 302 according to the embodiment 2 is different from the two-dimensional reference table 1021 according to the embodiment 1 in that CQI thresholds are equal between adjacent table areas in selecting an MCS combination in a part of divided areas where the stream #1 CQI and the stream #2 CQI are relatively low. Specifically, it is different from the two-dimensional reference table 1021 according to the embodiment 1 in that the upper limit values of the stream #1 CQI in the areas (1, 1) to (1, 3) and the upper limit values of the stream #1 CQI in the areas (1, 4) to (1, 6) are equal, and the upper limit values of the stream #1 CQI in the areas (2, 1) to (2, 3) and the upper limit values of the stream #1 CQI in the areas (2, 4) to (2, 6) are equal to each other. Further, the two-dimensional reference table 3021 is different from the two-dimensional reference table 1021 according to the embodiment 1 in that the upper limit values of the stream #2 CQI in the areas (1, 1) to (3, 1) are equal to the upper limit values of the stream #2 CQI in the areas (4, 1) to (6, 1) and the upper limit values of the stream #2 CQI in the areas (1, 2) to (3, 2) are equal to the upper limit values of the stream #2 CQI in the areas (4, 2) to (6, 2).

In the two-dimensional reference table 3021 illustrated in FIG. 4, the thresholds of the stream #1 CQI and the stream #2 CQI are equal in an area where the modulation schemes selected for streams do not depend on each other, or in other words, in an area where there hardly occurs the situation in which transmitted plural symbols cannot be estimated in signal separation in the mobile station 200. For example, the symbol group made of symbols of QPSK designated by the MCSs of the stream #1 and symbols of 16QAM designated by the MCS of the stream #2 in the areas (1, 4) to (1, 6) can be identified in signal separation in the mobile station 200 and plural transmitted symbols can be estimated. Therefore, in the two-dimensional reference table 3021 according to the embodiment 2, the thresholds of the stream #1 CQI and the stream #2 CQI in areas where signal separation is not interrupted in the mobile station 200 are equal to each other and the number of set thresholds of the stream #1 CQI and the stream #2 CQI in the two-dimensional reference table 3021 is reduced.

In this way, in the base station 300 according to the embodiment 2, the MCS selector 302 has the two-dimensional reference table 3021 in which CQI thresholds for selecting MCS combinations are equal between the adjacent table areas in a part of divided areas where the stream #1 CQI and the stream #2 CQI are relatively low. As this is used as a basis to select an optimal MCS for each stream, it is possible to reduce the number of set upper limit values of the stream #1 CQI and the stream #2 CQI in the two-dimensional reference table, to reduce the load of creating of the two-dimensional reference table 3021 and to reduce the processing in signal separation in the mobile station 200.

Embodiment 3

A base station 400 according to an embodiment 3 of the present invention has MCS selectors 402 that are equivalent to the MCS selector 102, and the number of MCS selectors 402 depends on the number of streams used in radio communications, which is difference from that in the base station 100 of the embodiment 1. As to the other structure of the base station 400, channel coders 104, data modulators 105, IFFT sections 107, CP adding sections 108, PF circuits 109 and antennas 110 are provided in accordance with the number of streams, and these are basically common with those of the base station 100 according to the embodiment 1. Therefore, explanation is made mainly about their differences. Besides, the mobile station 200 that performs radio communications with the base station 400 has antennas 201, duplexers 202, RF reception circuits 203, FFT parts 204, data demodulators 206 and channel decoders 207 in accordance with the number of streams. The mobile station is basically common with the mobile station 200 according to the embodiment 1 and its explanation is omitted here.

Figure 5:
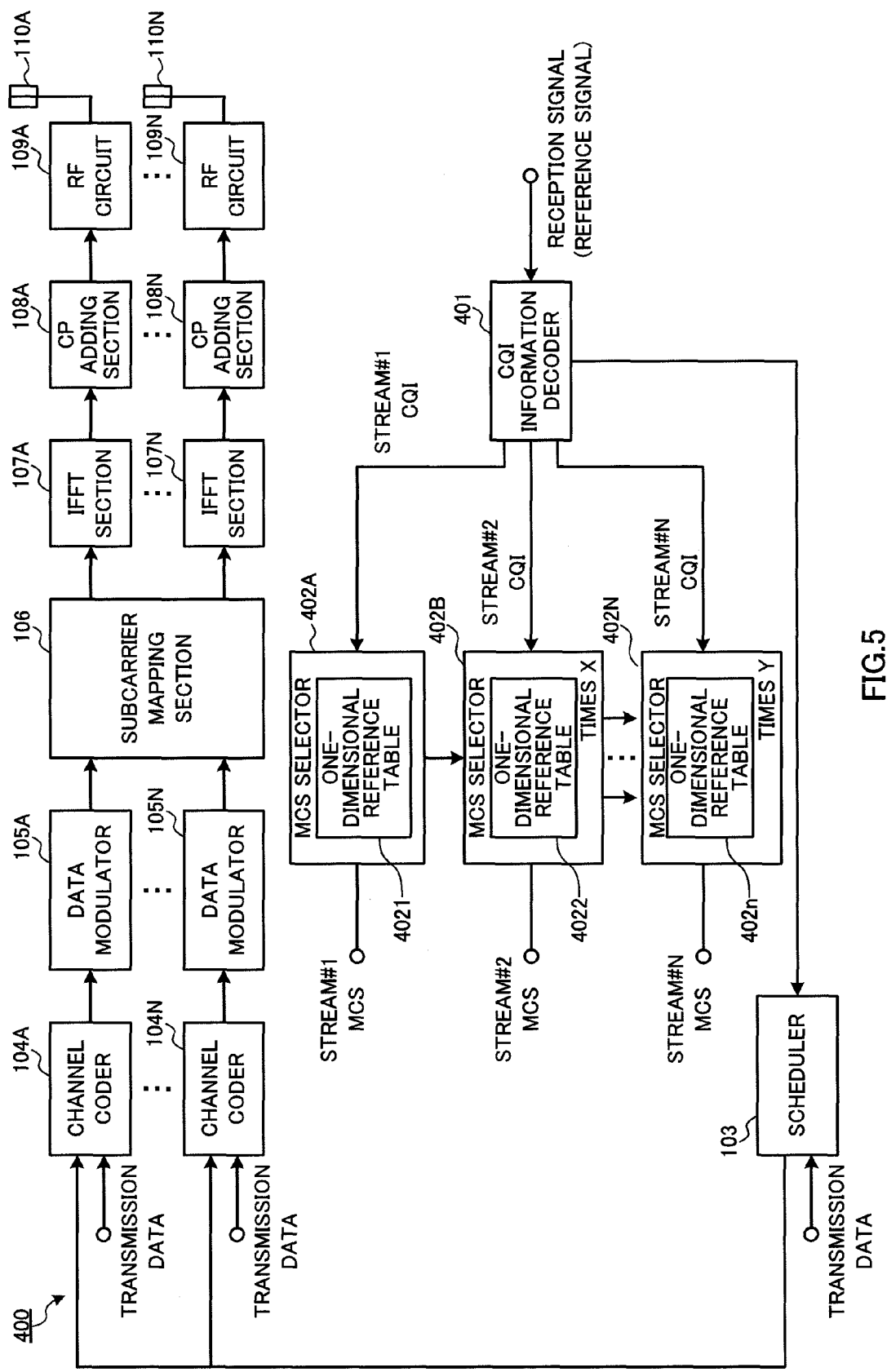
FIG. 5 is a block diagram illustrating a configuration of a transmitting unit of a radio base station apparatus according to an embodiment 3 of the present invention.

FIG. 5 is a block diagram illustrating the configuration of the transmitting unit of the base station 400 according to the embodiment 3. The transmitting unit of the base station 400 illustrated in FIG. 5 is different from the transmitting unit of the base station 100 according to the embodiment 1 in that the base station 400 has three or more transmission/reception antennas and performs radio communications with the mobile station 200 with three or more transmission/reception antennas. Particularly, in FIG. 5, the base station 400 has N transmission/reception antennas (N is a positive integer). In FIG. 5, elements common with those in FIG. 1 are denoted by the same reference numerals and explanation thereof is omitted here.

The base station 400 illustrated in FIG. 5 has MCS selectors 402A to 402N in accordance with the number N of streams. The MCS selectors 402A to 402N receive CQIs of respective corresponding streams. Here, the MCS selector 402A corresponds to the stream #1, the MCS selector 402B corresponds to the stream #2, . . . , the MCS selector 402N corresponds to the stream #N. Accordingly, the MCS selector 402A receives the stream #1 CQI, the MCS selector 402B receives the stream #2 CQI, . . . , the MCS selector 402N receives the stream #N CQI.

The CQI information decoder 401, which outputs CQIs to these MCS selectors 402A to 402N, decodes CQIs of the streams #1 to #N (stream #1 CQI to stream #N CQI) fed back from the mobile station 200, arranges them in ascending order of CQI and outputs them to the MCS selectors 402A to 402N. Arranging of CQIs of the streams #1 to #N in ascending order of CQI is performed in order to select MCSs for the streams in ascending order of CQI because there is no need to consider MCSs of other streams when CQI values are low, as described later. Here, for convenience of explanation, it is assumed that the CQI values becomes greater in the order of the stream #1 CQI, the stream #2 CQI, . . . , the stream #N CQI, which are input to the MCS selectors 402A to 402N, respectively.

The MCS selector 402A has a one-dimensional reference table 4021 in which optimal MCSs are defined in advance in accordance with the smallest CQI values (here, the stream #1 CQI), and the stream #1 CQI input from the CQI information decoder 401 is used as a basis to select an optimal MCS for the stream #1 (stream #1 MCS). Then, the selected stream #1 MCS is output to the channel coder 104 and the data modulator 105 of the stream #1.

The MCS selector 402B has plural one-dimensional reference tables 4022 (X tables in FIG. 5) in which optimal MCSs are defined in accordance with the second smallest CQI values (here, the stream #2 CQI), based on the type of MCS selected by the MCS selector 402A, and the stream #1 MCS notified from the MCS selector 402A and the stream #2CQI input from the CQI information decoder 401 are used as a basis to select an optimal MCS for the stream #2 (stream #2 MCS). Then, the selected stream #2MCS is output to the channel coder 104 and the data modulator 105 of the stream #2.

The MCS selector 402N has plural one-dimensional reference tables 402n (Y tables in FIG. 5) in which optimal MCSs are defined in accordance with the greatest values of CQI (here, the stream #N CQI), based on the types of MCS selected by the MCS selectors 402A to 402(N−1), and the stream #1 MCS to the stream #(N−1) MCS notified from the MCS selectors 402A to 402(N−1) and the stream #N CQI input from the CQI information decoder 401 are used as a basis to select an optimal MCS for the stream #N (stream #N MCS). Then, the selected stream #NMCS is output to the channel coder 104 and the data modulator 105 of the stream #N.

In the base station 400 according to the embodiment 3, MCS selection by the MCS selector 402 is performed on streams decoded by the CQI information decoder 401 in ascending order of CQI. In this way, as the MCS selection is performed in ascending order of CQI, if the modulation scheme of another stream is the same as that of the original stream or higher-valued modulation scheme, the reception quality for CQI (error rate) become substantially identical irrespective of the modulation scheme of the other stream and it becomes possible to perform MCS selection without considering dependence of MCSs of other streams of greater CQIs. Then, the MCS selected in advance is used in next selecting of an MCS by the MCS selector 402. In the above-described example, the MCS selector 402A first selects the stream #1 MCS, and then, the MCS selector 402B selects the stream #2 MCS using the stream #1 MCS. Thus, as the selected MCS is used in next selecting of an MCS by the MCS selector 402, it is possible to reduce the number of choices in following MCS selection and to simplify the processing required for MCS selection.

Here, in the channel coder 104 and the data modulator 105 that receive the stream #1 MCS to the stream #N MCS from the MCS selectors 402A to 402N, transmission data from a higher-level apparatus is subjected to channel coding and data modulation in accordance with the coding rate and modulation scheme designated by the stream #1 MCS to stream #N MCS. With this structure, as the CQI from the mobile station 200 is incorporated and data modulation is performed with the inter-independent modulation scheme, it is possible to prevent the situation where the plural symbols transmitted at the mobile station 200 cannot be estimated and the transmission data needs to be sent again, thereby enhancing the throughput of the overall system.

Besides, the stream #1 MCS to the stream #N MCS selected by these MCS selectors 402A to 402N are communicated to the downlink control signal generator, included in a downlink control signal generated by this downlink control signal generator and communicated to the mobile station 200 on the downlink. These stream #1 MCS to the stream #N MCS are used in data demodulation and channel decoding of reception signals of the streams #1 to #N at the mobile station 200.

Here, in the configuration of the transmitting unit of the base station 400 illustrated in FIG. 5, N MCS selectors 402A to 402N are provided in accordance with the number N of streams, and one or plural one-dimensional reference tables 4021 to 402n are provided in each of the MCS selectors 402A to 402N. However, if the above-described functions of N MCS selectors 402A to 402N can be realized, they may be replaced with a single MCS selector 402. In such a case, there is no need to perform arranging of decoded CQIs of streams in ascending order of CQI by the CQI information decoder 401, and the MCS selector 402 may perform such arrangement.

Figure 6:
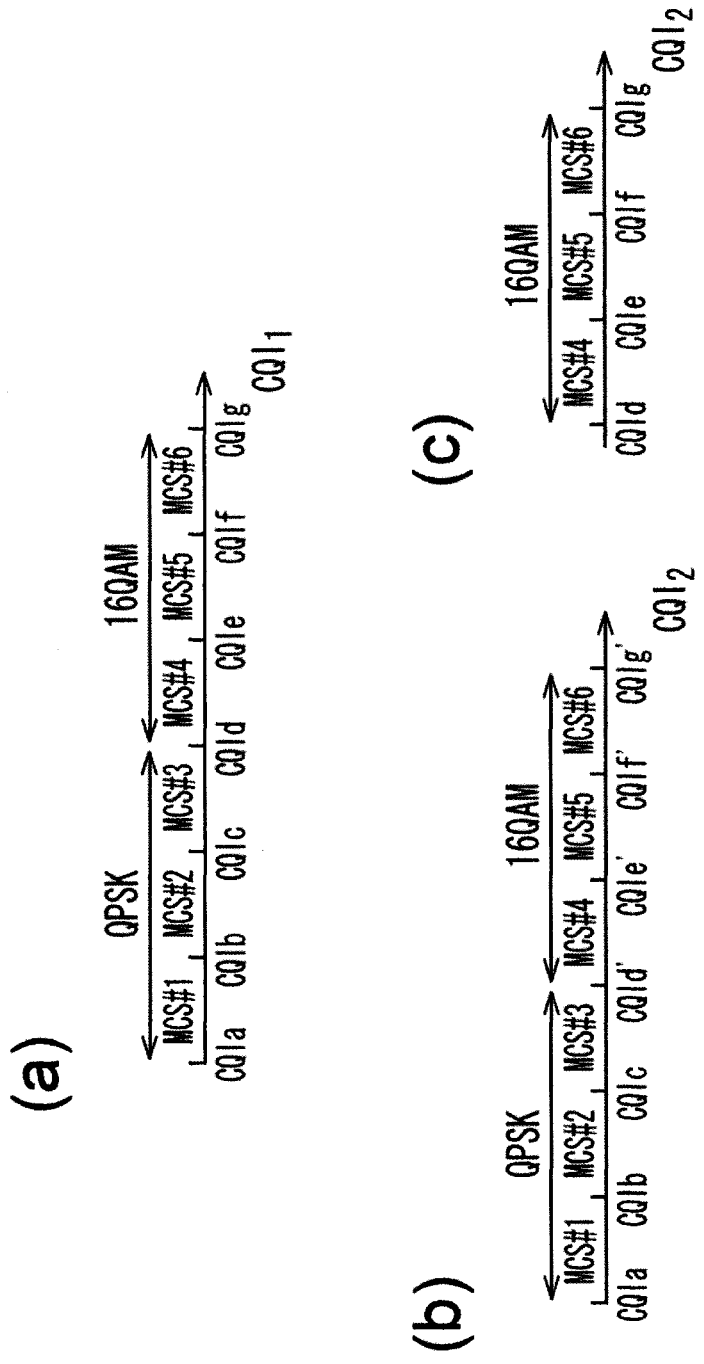
FIGS. 6(a) to 6(c) are pattern diagrams each for explaining contents of a one-dimensional reference table provided in an MCS selector of the radio base station apparatus according to the embodiment 3.
Figure 7:
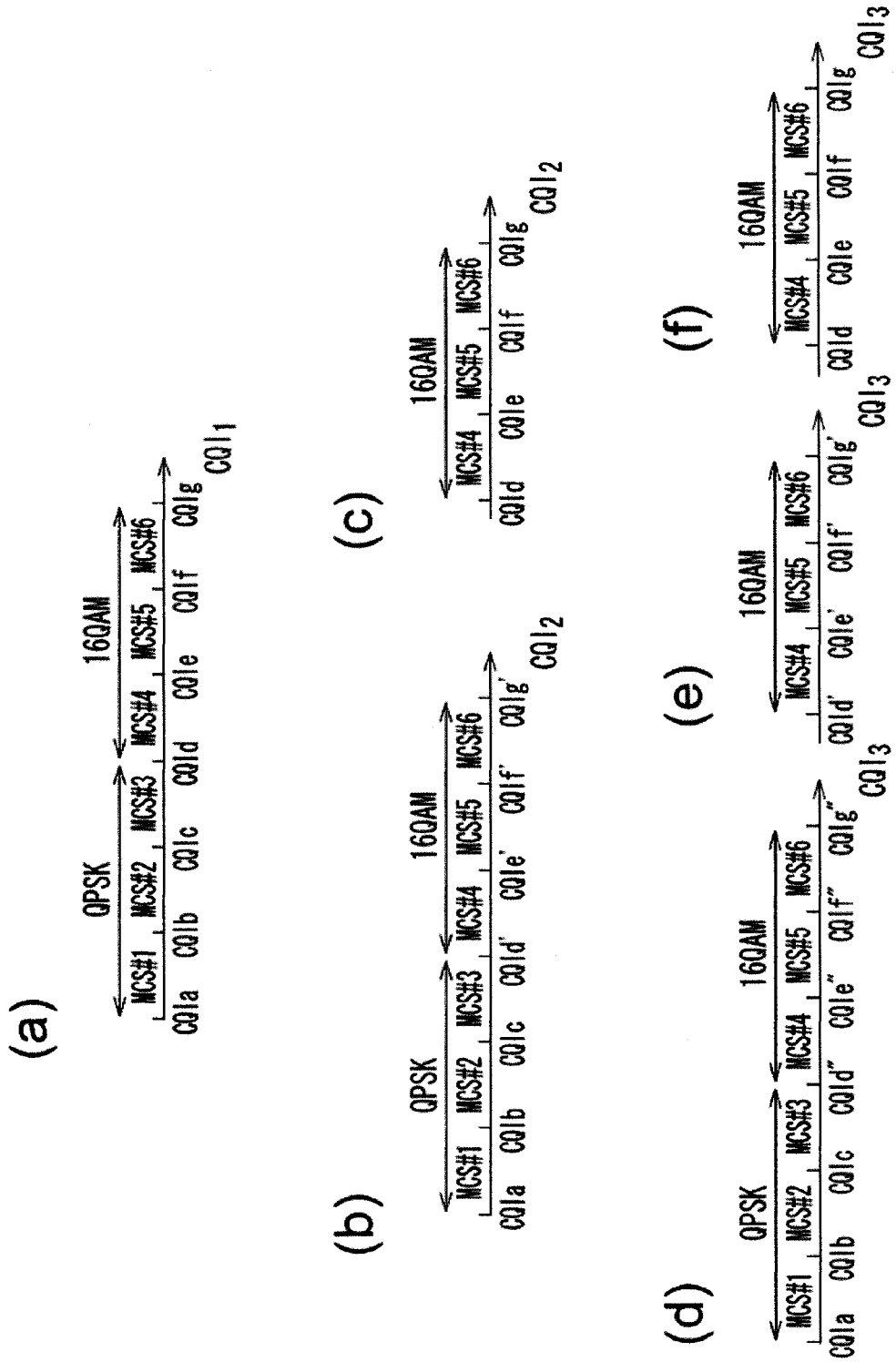
FIGS. 7(a) to 7(f) are pattern diagrams each for explaining contents of a one-dimensional reference table provided in an MCS selector of the radio base station apparatus according to the embodiment 3.

Here, description is made, with reference to FIGS. 6(a) to 7(f), about contents of each one-dimensional reference table provided in the MCS selector 402 of the base station 400 according to the embodiment 3. FIGS. 6(a) to 7(f) are pattern diagrams for explaining the contents of the one-dimensional reference table of the MCS selector 402 of the base station 400 according to the embodiment 3. In FIGS. 6(a) to 6(c), radio communications are performed with two streams and in FIGS. 7(a) to 7(f), radio communications are performed with three streams. Here, in FIGS. 6(a) to 7(f), the stream #1 CQI, the stream #2 CQI and the stream #3 CQI are expressed as $CQI_1$, $CQI_2$ and $CQI_3$.

Further, in FIGS. 6(a) to 7(f), like in FIGS. 3 and 4, MCSs #1 to #6 composed of the modulation scheme of QPSK and 16QAM and coding rate of ⅓, ½ and ¾ are defined in accordance with CQIs, however, the modulation scheme and coding rate are not restricted to them. Besides, on the one-dimensional reference table illustrated in FIGS. 6(a) to 7(f), the structures of modulation scheme and coding rate of the MCSs #1 to #6 are the same as those in FIGS. 3 and 4.

FIG. 6(a) illustrates an example of a one-dimensional reference table 4021 of the MCS selector 402A. In the one-dimensional reference table 4021 illustrated in FIG. 6(a), MCSs #1 to #6 are defined in accordance with the stream #1 CQI. According to the one-dimensional reference table 4021 illustrated in FIG. 6(a), when the stream #1 CQI is smaller than CQId, selection is made from the MCSs #1 to #3 containing the modulation scheme of QPSK and when the stream #1 CQI is equal to or greater than CQId, selection is made from the MCSs #4 to #6 containing the modulation scheme of 16QAM.

FIGS. 6(b) and 6(c) illustrate an example of the one-dimensional reference table 4022 of the MCS selector 402B. FIG. 6(b) illustrates the one-dimensional reference table 4022 which is referred to when selection is made from the MCSs #1 to #3 containing QPSK and FIG. 6(c) illustrates the one-dimensional reference table 4022 which is referred to when selection is made from the MCSs #4 to #6 containing 16QAM.

In the one-dimensional reference table 4022 illustrated in FIG. 6(b), the MCSs #1 to #6 are defined in accordance with values of the stream #2 CQI. According to the one-dimensional reference table 4022 illustrated in FIG. 6(b), when the stream #2 CQI is smaller than CQId', selection is made from the MCSs #1 to #3 containing the modulation scheme of QPSK and when the stream #2 CQI is equal to or greater than CQId', selection is made from the MCSs #4 to #6 containing the modulation scheme of 16QAM.

Here, CQId', CQIe', CQIf' and CQIg' illustrated in FIG. 6(b) are set to be smaller than CQId, CQIe, CQIf and CQIg illustrated in FIG. 6(a), respectively. This is because it is assumed that the stream #2 CQI values are greater than the stream #1 CQI values and the same modulation scheme as that of the stream #1 or higher-valued modulation scheme is selected, on the other hand, as the QPSK is selected for the stream #1, there is broader room for positive selection of 16QAM as compared with the case of the stream #1.

Meanwhile, in the one-dimensional reference table 4022 illustrated in FIG. 6(c), MCSs #4 to #6 are defined in accordance with values of the stream #2 CQI. In the one-dimensional reference table 4022 illustrated in FIG. 6(c), when a value of the stream #2 CQI is CQId or more, selection is made from MCSs #4 to #6 containing the modulation scheme of 16QAM. In this case, as any of the MCSs #4 to #6 containing 16QAM is selected for the stream #1 MCS, there is no need to create a table for the MCSs #1 to #3 containing the lower-valued modulation scheme of QPSK. In this way, as the table of MCSs containing unselectable modulation scheme can be omitted in accordance with the type of MCS selected in advance, the contents of the one-dimensional reference table 4022 can be simplified.

In addition, the contents shown in FIGS. 7(a) to 7(c) are equivalent to those shown in FIGS. 6(a) to 6(c). FIGS. 7(d) to 7(f) illustrate one example of the one-dimensional reference table 4023 of an MCS selector 402C. FIG. 7(d) illustrates the one-dimensional reference table 4023 which is referred to when the MCSs #1 to #3 containing QPSK are selected for the stream #1 MCS and the stream #2 MCS. FIG. 7(e) illustrates the one-dimensional reference table 4023 which is referred to when MCSs #1 to #3 containing QPSK are selected for the stream #1 MCS and MCSs #4 to #6 containing 16QAM are selected for the stream #2 MCS. FIG. 7(f) illustrates the one-dimensional reference table 4023 which is referred to when MCSs #4 to #6 containing 16QAM are selected for the streams #1 MCS and the stream #2 MCS.

In the one-dimensional reference table 4023 illustrated in FIG. 7(d), the MCSs #1 to #6 are defined in accordance with values of the stream #3 CQI. According to the one-dimensional reference table 4023 illustrated in FIG. 7(d), when the stream #3 CQI is smaller than CQId'', the MCSs #1 to #3 containing the modulation scheme of QPSK are selected and when the stream #3 CQI is equal to or greater than CQId'', the MCSs #4 to #6 containing the modulation scheme of 16QAM are selected. Here, CQId'', CQIe'', CQIf'' and CQIg'' illustrated in FIG. 7(d) are set to be smaller than CQId', CQIe', CQIf' and CQIg' illustrated in FIG. 7(b), respectively.

In the one-dimensional reference table 4023 illustrated in FIG. 7(e), the MCSs #4 to #6 are defined in accordance with values of the stream #3 CQI. According to the one-dimensional reference table 4023 illustrated in FIG. 7(e), when the stream #3 CQI is equal to or greater than CQId', selection is made from MCSs #4 to #6 containing the modulation scheme of 16QAM. In this case, as any of MCSs #4 to #6 containing 16QAM is selected for the stream #2 MCS, there is no need to create any table of MCSs #1 to #3 containing QPSK, like in FIG. 7(c).

In the one-dimensional reference table 4023 illustrated in FIG. 7(f), the MCSs #4 to #6 are defined in accordance with values of the stream #3 CQI. According to the one-dimensional reference table 4023 illustrated in FIG. 7(f), when the stream #3 CQI is equal to or greater than CQId, the MCSs #4 to #6 containing the modulation scheme of 16QAM are selected. In this case, as any of the MCSs #4 to #6 containing 16QAM is selected for the stream #2 MCS, there is no need to create any table of MCSs #1 to #3 containing QPSK, like in FIGS. 7(c) and 7(e). Thus, as the table of MCSs containing unselectable modulation scheme is omitted in accordance with the type of MCS selected in advance, the content of the one-dimensional reference table 4023 can be simplified.

Thus, in the base station 400 according to the embodiment 3, the one-dimensional reference table in which MCSs are defined in accordance with CQIs of respective streams is used as a basis to select MCSs in accordance with CQIs of respective streams in ascending order of CQI. With this structure, it is possible to perform selecting of MCSs without need to consider dependence on MCSs for other streams of larger CQIs, thereby facilitating selecting of optimal modulation and coding schemes for the transmission streams as compared with the case of considering such dependence.

Particularly, in the base station 400 according to the embodiment 3, an MCS of a stream selected in advance and a CQI decoded by the CQI information decoder 401 are used as a basis to select an MCS of a following stream. With this structure, it becomes possible to reduce the number of choices (choices on the one-dimensional table) in selecting the following MCSs and to simplify the processing required to select the MCSs.

Further, in the base station 400 according to the embodiment 3, plural one-dimensional reference tables in which MCSs are defined in accordance with types of MCS of streams selected in advance by the preceding MCS selector 402 (for example, MCS selector 402A) are provided in a following MCS selector 402 (for example, MCS selector 402B), and a one-dimensional reference table is selected in accordance with the type of MCS of a stream selected in advance thereby to select an MCS for a following stream. With this structure, it is possible to eliminate information about MCSs that cannot be selected from the one-dimensional reference table, thereby simplifying the contents of the one-dimensional reference table, reducing the load of creating the one-dimensional reference table and reducing the processing in signal separating in the mobile station 200.

The present invention is not limited to the above-described embodiments and may be embodied in various modified forms. For example, in the above-described embodiments, the shared data is interleaved to be transmitted at the transmission side and interleaved at the reception side. However, this is not intended for limiting the present invention. The present invention may also apply to the case where the shared data is not interleaved. Further, the data block allocation pattern, the number of processing sections, the processing procedure, the number of component carriers and the number of data blocks, and the data block range in the above description may be changed appropriately without departing from the scope of the present invention. Also, any other structure or element may be changed appropriately without departing from the scope of the present invention.

The present specification is based on Japanese Patent Applications No. 2009-045316 filed on Feb. 27, 2009, the entire contents of which are expressly incorporated by reference herein.

The invention claimed is:

1. A radio base station apparatus comprising:
decoding section configured to decode CQIs of plural downlink transmission streams; and
selecting section configured to have an N-dimensional table in accordance with a number N of the downlink transmission streams where combinations of modulation and coding scheme between the plural downlink transmission streams are defined in accordance with the CQIs of the respective downlink transmission streams, the selecting section configured to select a combination of modulation and coding scheme between the plural downlink transmission streams based on each of the CQIs of the downlink transmission streams decoded by the decoding section.

2. The radio base station apparatus according to claim 1, wherein the table has a plurality of table areas in which the combinations of modulation and coding scheme between the downlink transmission streams are defined to include different modulation schemes and a difference is provided between CQI thresholds of adjacent table areas out of the table areas for selecting from the combinations of modulation and coding scheme.

3. The radio base station apparatus according to claim 2, wherein each of the table areas is divided into a plurality of divided areas where the combinations of modulation and coding scheme of the downlink transmission streams are defined to include different coding rates.

4. The radio base station apparatus according to claim 3, wherein in the table, the CQI thresholds for selecting from the combinations of modulation and coding scheme in a part of the divided areas where each of the CQIs of the downlink transmission streams are relatively low are equal between the adjacent table areas.

5. A radio base station apparatus comprising:
decoding section configured to decode CQIs of plural downlink transmission streams; and
selecting section configured to have a table in which modulation and coding schemes are defined in accordance with the CQIs of the downlink transmission streams, the selecting section configured to select from the modulation and coding schemes of the downlink transmission streams based on the CQIs of the respective downlink transmission streams decoded by the decoding section, in ascending order of CQI.

6. The radio base station apparatus according to claim 5, wherein the selecting section uses a modulation and coding scheme of a downlink transmission stream selected in advance and a CQI decoded by the decoding section as a basis to select a modulation and coding scheme of a following downlink transmission stream.

7. The radio base station apparatus according to claim 6, wherein the table comprises a plurality of tables in which the modulation and coding scheme is defined in accordance with types of the modulation and coding scheme of the downlink transmission streams selected in advance and the selecting section selects from the tables in accordance with the types of the modulation and coding scheme selected in advance and selects the modulation and coding scheme of the following downlink transmission stream.

8. A method for selecting a modulation and coding scheme, comprising the steps of:
decoding CQIs of plural downlink transmission streams; and
from an N-dimensional table in accordance with a number N of the downlink transmission streams where combinations of the modulation and coding scheme between the plural downlink transmission streams are defined in accordance with the CQIs of the respective downlink transmission streams, selecting a combination of modulation and coding scheme between the plural downlink transmission streams based on the each of CQIs of the downlink transmission streams decoded.

9. A method for selecting a modulation and coding scheme, comprising the steps of:
decoding CQIs of plural downlink transmission streams; and
using a table where modulation and coding schemes are defined in accordance with the CQIs of the respective downlink transmission streams as a basis to select from the modulation and coding schemes in accordance with the CQIs of the downlink transmission streams in ascending order of CQI.

* * * * *